United States Patent [19]
Eaton

[11] 4,080,814
[45] Mar. 28, 1978

[54] SET-UP GUIDE FOR BENDING MACHINE

[75] Inventor: Homer L. Eaton, Balboa, Calif.

[73] Assignee: Eaton-Leonard Corporation, Santa Ana, Calif.

[21] Appl. No.: 734,398

[22] Filed: Oct. 21, 1976

[51] Int. Cl.² .............................................. B21C 51/00
[52] U.S. Cl. ........................................... 72/32; 72/36; 72/389
[58] Field of Search .................. 72/31, 32, 33, 35, 36, 72/12, 21, 22, 389; 73/1 D, 1 E; 235/103; 83/522; 116/115, 124 A, 129 R

[56] References Cited

U.S. PATENT DOCUMENTS

| | | | |
|---|---|---|---|
| 3,116,779 | 1/1964 | Procter et al. | 72/34 |
| 3,126,045 | 3/1964 | Streit | 72/421 |
| 3,145,756 | 8/1964 | Hill | 72/7 |
| 3,553,989 | 1/1971 | Munro et al. | 72/8 |
| 3,618,349 | 11/1971 | Roch | 72/36 |
| 3,807,265 | 4/1974 | Mohr | 83/522 |
| 3,823,454 | 7/1974 | Fisher | 83/522 |
| 3,974,676 | 8/1976 | Eaton | 72/27 |

Primary Examiner—Michael J. Keenan
Attorney, Agent, or Firm—Gausewitz, Carr & Rothenberg

[57] ABSTRACT

Positioning of a pipe longitudinally and rotationally for each of a number of bends is facilitated by means of a fitting attached to the pipe end and connected with longitudinal and rotational displacement encoders that generate electrical signals. The signals drive a quantitative display of present actual longitudinal and rotational position of the pipe so that no sliding or rotational stops need be employed. One of the encoders is arranged for connection to a fixture which can be used for adjustment of the length of a depth of bend stop rod, employing the same quantitative display.

17 Claims, 6 Drawing Figures

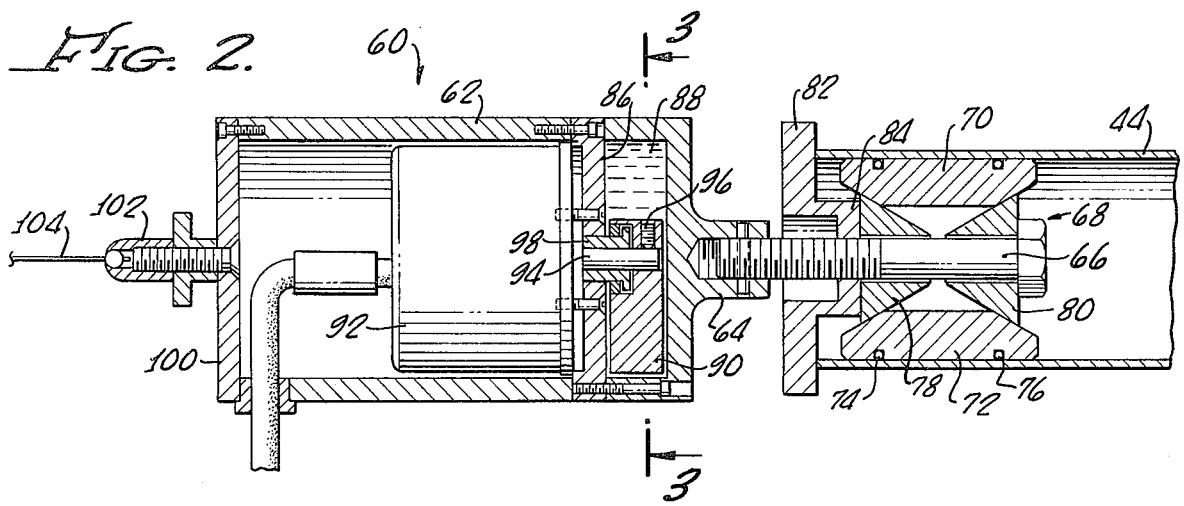
FIG. 2.
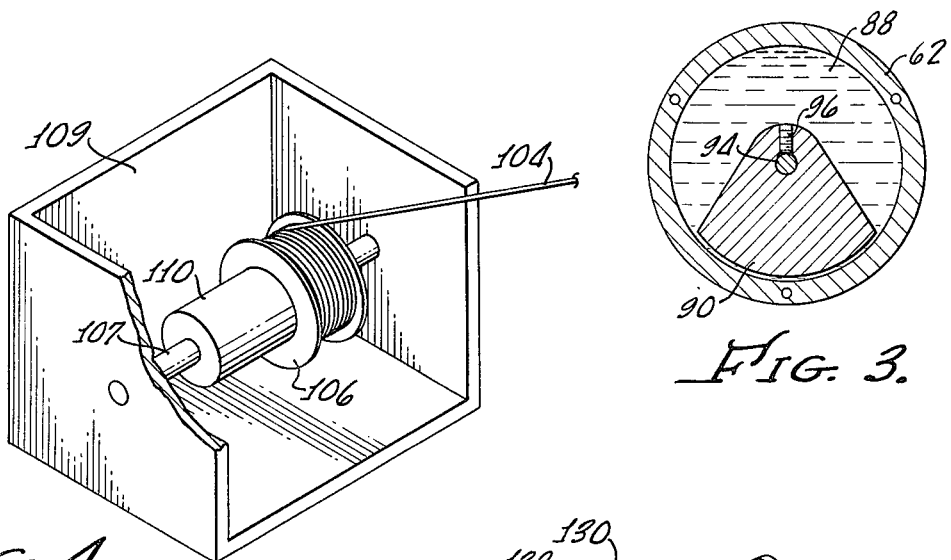
FIG. 3.
FIG. 4
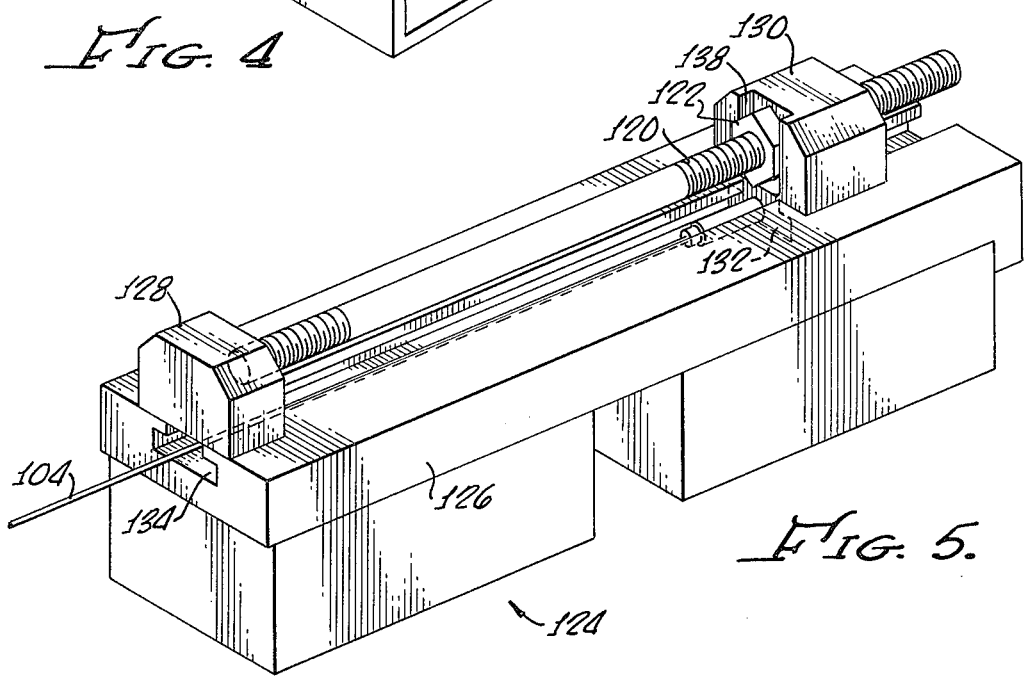
FIG. 5.

SET-UP GUIDE FOR BENDING MACHINE

BACKGROUND OF THE INVENTION

The present invention relates to pipe bending machines and more particularly concerns methods and apparatus for rapidly and accurately positioning a pipe for making a plurality of bends in accordance with given bend data.

In the bending of pipes, and particularly in the bending of automobile exhaust pipes, it is necessary to make a plurality of bends in the pipe with preselected relative positions, orientations and bend magnitudes. The finished pipe must have each bend located at a given longitudinal position with respect to an end of the pipe. Each bend must lie in a predetermined plane with respect to the planes of other bends and each bend must have a predetermined depth or angle of bend. The data defining these bend parameters, longitudinal position, plane of bend or pipe rotation and depth of bend or angle of bend is predetermined in any one of a number of ways. The data may be calculated from known equipment with which the pipe is to be employed, a sample pipe may be bent to fit the known equipment and the pipe may then be measured to provide the data, or an existing pipe may be measured to provide the given bend data.

Many bending machines are automated either completely or in varying degrees so that the given bend data may be programmed into a machine control and the machine operated under control of its program to automatically produce a series of bends in a pipe. An exemplary automatically controlled tube bending machine is shown in the patent to Hill U.S. Pat. No. 3,145,756. Such machines are complex and expensive and in many situations their cost, as compared to manually controlled machines, cannot be economically justified. Further, there are many manually controlled machines presently used which do not warrant replacement with automatic machines.

In typical manually controlled machines the pipe is moved by hand to a longitudinal position of the first bend and rotated by hand so that the bend will be in a predetermined plane. An hydraulic drive for a ram die is manually initiated to cause the die to bend the pipe against restraining wing dies. Depth of bend or angle of bend in such a machine is often controlled by a switch actuator connected with the hydraulic ram and positioned to engage an adjustable length stop rod as the ram reaches a desired end of its bend motion travel. The switch is thus actuated when the bend has been accomplished to the given depth as determined by the depth of bend stop. The ram die is automatically returned to a starting position after having completed the first bend. The pipe is then positioned by hand in a second longitudinal position and rotated about its longitudinal axis to achieve the second plane of bend. The depth of bend stop rod is adjusted in length or, in machines such as shown in the patent to Streit U.S. Pat. No. 3,126,045, a rotatable support mounting a plurality of preadjusted depth of bend stop rods is then moved to position the next stop rod in the path of the ram die limit switch. Then the second bend is completed by manually starting the hydraulically driven ram die. In some cases, as in the patents to Lance U.S. Pat. Nos. 3,339,385 and 3,581,537, and the patent to Ignoffo U.S. Pat. No. 3,388,574, the depth of bend is controlled by stops or tabs positioned on the wing dies so as to stop the motion of the ram die when the wing die has rotated through a predetermined angle.

In the past given bend data for use in manually controlled machines has been employed in a laborious, timeconsuming and imprecise manipulation of mechanical elements that provide physical stops to properly position the pipe both longitudinally and rotationally. Errors and lack of precision in machine set up are frequent and variable at least in part because of the number and type of specific adjustments that must be made by hand. Commonly the bending machine is a press type bender in which a ram die is hydraulically driven in a direction normal to the axis of the pipe to be bent and the pipe is bent between the ram and a pair of pivotally mounted restraining wing dies. The pipe to be bent is supported upon a long pipe bed adjacent the bending die. The pipe bed is provided with a number of adjustably mounted mechanisms that are positioned by the operator for set up of the manually controlled bending machine in accordance with the given bend data. Thus, a number of stops are slidably mounted on the pipe supporting bed and adjustably positioned longitudinally of the bed so that the pipe may be longitudinally positioned in abutment with the stops for each of a number of successive bends. A protractor type of device is often employed to position the pipe rotationally. In some devices of the prior art each of the longitudinal position stops also has a protractor so that an end of the pipe may be positioned in both longitudinal and rotational abutment with different ones of the stops in succession. In other devices linear or rotational scales are mounted directly upon the pipe supporting bed and various means are employed to facilitate positioning of the pipe with respect to such scales.

The patent to Zerlaut U.S. Pat. No. 3,336,776 employs a number of adjustable stop rings and associated electrical switch elements for correlating the rotational plane of bend and the motion of the ram die which determines the degree of bend.

In general, in the prior art arrangements for set up of a manually controlled bending machine, a large number of mechanical stops and one or more protractors are employed, and each of these elements must be manually positioned in accordance with given data. The manual positioning and adjustment of each of these elements not only requires a great deal of time and skill of an operator but even so, results in significant errors in magnitude and position of the bends. Thus, it is common for an operator to bend a number of sample pipes before achieving one that has all of its bends within the allowable tolerances. The various stops are set up according to the given bend data and a first sample pipe is bent. This sample pipe is then measured and is normally found to be unsatisfactory whereupon adjustments are made in the positioning of the various stops in an attempt to decrease the measured error. A second pipe is then bent and this procedure of bending and measuring a pipe, adjusting the various stops and again bending, measuring and adjusting, may be continued for a large number of pipes and for several hours before a satisfactory positioning of the stops is finally achieved.

The expense and time involved in initial set up of a manually controlled bending machine is justified for long production runs but is not economically feasible when relatively small numbers of pipes of a given configuration are to be produced. For such small runs, one must either employ an expensive, automatic bending machine or significantly increase the cost of the resulting pipes due to the cost of the large amount of set up time.

Once the stops have been properly adjusted for production of an acceptable pipe of a long production run, a skeletal structure having a number of pipe abutting brackets is constructed adjacent the bending machine so that after each bend the pipe may be moved longitudinally and rotationally until an already bent portion of the pipe abuts one of the brackets of the skeletal structure. Such bracket has been positioned so that with a portion of the bent pipe in abutment therewith, the pipe is in proper position with respect to the bending dies for the next bend. This skeletal structure includes a number of brackets sufficient to position the pipe for all of the bends to be made therein, but can be adjusted only after going through the multiple trail and error bending of many sample pipes and adjustment of the stops and protractors.

Accordingly, it is an object of the present invention to facilitate set up of manually controlled pipe bending machines and to decrease the time of set up of such pipe bending machines.

SUMMARY OF THE INVENTION

In carrying out principles of the present invention in accordance with a preferred embodiment thereof, first and second electrical signals are generated respectively indicative of angular displacement of a pipe about its longitudinal axis and longitudinal displacement of the pipe along its axis. The signals are presented for quantitative display and the pipe is displaced both longitudinally and rotationally until the displays present given data for a first one of the bends. The bend is then accomplished and the pipe again displaced longitudinally and rotationally until the displays present the given data for the second bend. The next bend is then accomplished. To achieve this set up, an attachment is provided in the form of a fitting adapted to be connected to a pipe to be bent. First and second sensing means are connected with the fitting for generating first and second electrical signals respectively indicative of rotational and longitudinal position of the pipe. Means are provided for displaying values of pipe rotation and pipe longitudinal position in response to the signals provided by the sensing means.

BRIEF DESCRIPTION OF THE DRAWINGS

FIG. 2 is an enlarged detailed view of the pipe attached fitting of FIG. 1;

FIG. 3 is a section taken on lines 3—3 of FIG. 2;

FIG. 4 is a view of the longitudinal position signal generating mechanism of FIG. 1;

FIG. 5 illustrates a fixture for facilitating adjustment of the depth of bend stops.

DETAILED DESCRIPTION

Figure 1:
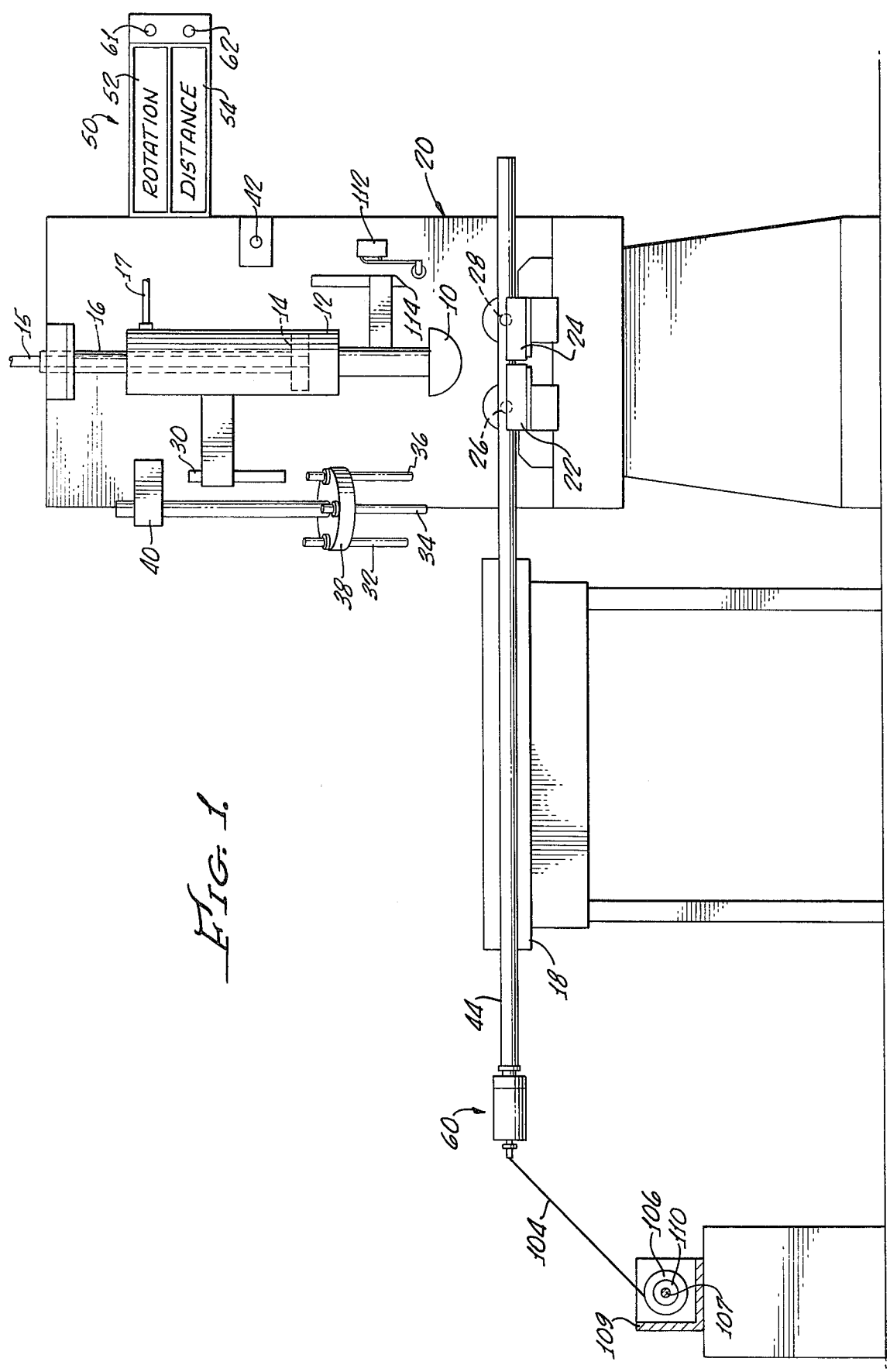
FIG. 1 shows parts of a manually controlled bending machine having a set up guide attachment embodying principles of the present invention.

Apparatus of the present invention is particularly adapted for use with various types of press benders, such as those shown in the patents to Bower, et al U.S. Pat. No. 2,887,141 and Proctor, et al U.S. Pat. No. 3,116,779. As schematically illustrated in FIG. 1, such a press bender comprises a vertically movable ram die 10 carried by an hydraulically driven cylinder or case 12 having a fixed piston 14 therein. The lower end of cylinder 12 is supplied with fluid under pressure via a conduit 15 and a hollow piston rod 16 that carries the piston. A source of low pressure fluid is connected to the upper end of cylinder 12 by a conduit 17. An elongated pipe support bed 18 is mounted adjacent the ram drive support structure 20 which carries a pair of wing dies 22, 24 mounted thereto for pivotal motion about axes 26, 28 which may be provided with conventional means (not shown) for limited restraint of the pivotal motion thereof.

A depth of bend (angle of bend) stop arm 30 is carried by the ram driving cylinder for vertical reciprocation therewith and for cooperation with one of a plurality of depth of bend stop rods such as 32, 34, 36. The stop rods are adjustable and mounted for selective positioning to successively cooperate with the stop arm 30. The stop rods are carried by a rotating plate or turret 38 that is mounted to a fixed bracket 40 for rotation about a vertical axis. Upon contact with one of the stop rods, arm 30 operates a control valve (not shown) to stop the downward motion and to initiate withdrawal of the ram die. A control panel, including an operator's control button 42, is mounted upon support structure 20 for initiating the vertical stroking of the ram die.

The structure described to this point is well known and exemplary of a conventional press bending machine. In operation of the conventional machine that has been described to this point, a pipe 44 that is to be bent is positioned on the support bed 18 so that the bending dies are located in a proper position and orientation with respect to a bend to be made in the pipe. Such positioning and orientation according to the present invention is more particularly described below. Stop rods 32, 34, 36 are adjusted (as more particularly described below) to selectively control the amount that upper portions thereof extend above plate 38 to thereby control the angle or depth of bend and the plate 38 is rotated to a first position for cooperation with the stop arm 30. Start button 42 is actuated, hydraulic fluid under pressure is thereupon fed to the cylinder 12 and ram die 10 is driven downwardly to bend the pipe against the restrained pivotal motion of the wing dies 22, 24 until the stop arm 30 strikes the selected stop rod to actuate conventional controls within the machine which stop downward motion of the ram die 10 and return it to its initial position.

The continuous downward bending motion of the ram die of the conventional machine is divided into a two step motion according to one feature of the present invention, as will be described below.

According to techniques employed prior to the present invention the length of the several stop rods are individually adjusted by use of a conventional scale or other linear measuring instrument. The longitudinal position of the pipe, which determines the longitudinal position of the bend to be made, was previously controlled, as mentioned above, by manually setting a number of slidably adjustable stops along the support bed 18. To control the plane of bend of a given bend, the pipe was manually rotated and its angular position controlled by use of a protractor or other angular measurement device connected with the pipe and adapted to abut one of a number of manually adjusted rotational stops.

In accordance with the present invention, all of these manual adjustments of stops for longitudinal and rotational positions are completely eliminated. Further, even the adjustment of length of stop rods is greatly facilitated. In accordance with the present invention, rotational and longitudinal positions of the pipe are merely read out on a digital display 50 that is suitably mounted upon the support 20 for ready visual observation by the operator. Display 50 includes a section 52 that provides a digital display of plane of bend, in degrees, and a section 54 that provides a digital display of the longitudinal position or distance to the bend, in inches. The operator merely moves the pipe by hand, longitudinally and rotationally, while visually observing the display 50. When the appropriate digital quantities corresponding to given bend data for the bend appear on the display, he knows that the pipe is properly positioned and the bend may be made. There are no slidable or otherwise movable stops to be manufactured, mounted upon the bed, or adjusted for each of the several bends.

This simple, rapid and unexpectedly and surprisingly accurate positioning of a pipe is achieved by a pipe readout attachment having a fitting 60 adapted to be secured to an end of the pipe remote from the bending dies. The fitting, together with additional equipment to be described, generates electrical signals that continuously indicate longitudinal position of the pipe and rotational position of the pipe. In a preferred embodiment these signals are of an incremental nature so that, after zeroing the display (as by means of operation of zero reset buttons 61, 62) when the pipe is in a predetermined reference position, any further movement of the pipe longitudinally and rotationally automatically changes the display 52, 54 so as to continue to read, quantitatively, the total rotational and longitudinal displacement from the reference positions.

As more particularly illustrated in FIG. 2, fitting 60 comprises a housing 62 having a centrally located boss 64 in which is fixed one end of a threaded and headed bolt 66 that carries a pipe end engaging chuck 68. Chuck 68 includes a plurality of circumferentially extending but separate chuck segments, such as segments 70, 72 held together by elastic bands 74, 76 and defining a pair of oppositely facing conical surfaces which receive conical plugs 78, 80 respectively. Plugs 78, 80 are apertured and bolt 66 extends therethrough. A knurled chuck actuating ring 82 is threaded upon the bolt 66 and has a locking face 84 that bears upon plug 78. With the knurled ring 82 retracted (moved toward the left in the illustration of FIG. 2), the chuck may be readily slipped into the end of a pipe 44 whereupon the knurled ring 82 may be turned upon the shaft or bolt 66 to thereby force the plugs against the conical surfaces and expand the chuck within the pipe to thereby lock the chuck to the pipe.

Housing 62 includes a dividing plate 86 which cooperates with the forward end of the housing to define a chamber 88 in which is pivotally mounted an angular reference device in the form of a pendulous mass 90. Fixed to dividing plate 86 and positioned within the aft part of housing 62 is an incremental encoder 92 having rotatable input shaft 94 to which the pendulous weight 90 is fixed as by means of a set screw 96. A bushing 98 extends about the encoder shaft 94 between the shaft and the divider plate 86 and helps to axially position the pendulous weight 90 so that the latter may swing relatively freely within the chamber 88.

Encoder 92 is a conventional shaft rotation incremental sensor which produces one output electrical pulse for each unit of rotational displacement of its input shaft. An encoder such as the incremental encoder, Part. No. 25G-900-ID-PA 2/5 manufactured by Sequential Information Systems of Elmsford, New York, may be used. A suitable, relatively viscous, damping fluid fills the interior of chamber 88 so as to damp motion of the pendulous weight 90. As the pipe 44 (and the fitting 60 attached thereto) is rotated about its longitudinal axis the damped pendulous mass 90 remains in a fixed orientation relative to the local vertical. Therefore encoder input shaft 94 is fixedly oriented and rotates relative to the encoder body as the pipe (and encoder body) are rotated.

An end cap 100 is fixed to the housing 62 and has a centrally positioned, fixedly mounted eye 102 to which is attached an inextensible, flexible line or cable 104. Cable 104 is wound upon a drum 106 which is journaled upon a shaft 107 for rotation about a substantially horizontal pivot axis that is fixedly positioned with respect to the bending machine. Preferably drum 106 and shaft 107 are mounted in a housing 109 suitably supported on the floor at a distance from the end of the pipe support bed 18 which is remote from the machine support 20. This spacing of the drum 106 from the support bed 18 enables use of the equipment with pipe of a length that will extend significantly beyond the end of the bed 18. Obviously the position and orientation of the drum and shaft may be varied as necessary or desirable.

Drum 106 is connected with a torsion spring (not shown) that tends to wind the drum in a counterclockwise direction as viewed in the drawings, a direction that tends to rewind the cable upon the drum. The spring is of such a strength that the cable may be readily unwound from the drum by an operator manually positioning the pipe 44 to which the fitting 60 is attached and yet, as the pipe and fitting are moved to the left as viewed in FIG. 1, all slack in the cable is taken up as the cable is automatically rewound upon the drum. Friction between the pipe and bed 18 is sufficient to prevent the drum spring from pulling the pipe along the bed 18.

Mounted upon the shaft 107 and having an input connected to be rotated by rotation of the drum is a second incremental encoder 110 which may be identical to encoder 92 and, accordingly, provides an output electrical pulse for each increment of rotation of the drum. Encoders 92 and 110 are connected by electrical leads (not shown) to the digital display 50.

A machine setup switch 117 is mounted upon the machine support 20 and arranged to be actuated by a set up finger 114 that is mounted for vertical motion with the ram die 10. Finger 114 is vertically adjustable relative to the die 10. Limit switch 112, which may be a conventional limit switch such as an Allen Bradley No. 802T limit switch, is positioned and connected with the driving control of the ram so as to stop the ram die 10 at the time of its initial contact with the pipe 44. Switch operating finger 114 is adjusted so that the die is stopped in its downward travel when it reaches an engagement with the pipe 44 that is sufficient to press pipe 44 lightly against the dies 22, 24 without disturbing the configuration of the pipe. This point of light contact of the die and pipe, determined by switch 112, is termed herein a "setup" position. No deformation of the pipe occurs until the machine moves beyond the setup position.

A first operation of start button 42 will drive the ram die 10 to its setup position, where the machine comes to a complete stop.

The construction and connection of switch 112 is such that upon a second operation of the start or control button 42, with the die in its set up position in contact with the pipe, the switch 112 is no longer operable to stop the ram die and further downward motion of the die in its bending mode will commence. Alternatively, switch 112 may be manually disabled after final rotational adjustment of the pipe and before the second actuation of start button 42. Die motion continues until a completion of the bend which, as it will be recalled, is signaled and controlled by contact of the stop arm 30 with one of the stop rods 32, 34, 36.

A typical operation of the manually controlled bending machine having the described setup guide attached thereto, will be explained assuming that the depth of bend stop rods 32, 34, 36, etc. have all been previously adjusted. As will be described hereinafter, portions of the apparatus of FIGS. 1, 2 and 3 may be employed with an additional fixture, to be described below, to facilitate adjustment of the length of the stop rods 32, 34, 36.

Presuming the depth of bend stop rods have all been adjusted, the fitting 60 is connected to an end of the pipe that is resting upon the bed 18. The beginning end of the pipe, namely the end at which the first bend is to be made, is then moved until it is positioned at the mid point of ram die 10, or if more convenient, at one end of either one of the wing dies 22, 24. It may be noted that this initial position which is a reference position at which the distance display will be zeroed, may be chosen as necessary or convenient as long as the same reference position is used in subsequent pipes. This is so because all repeatable errors in set up will be automatically corrected in the course of the bending of two or three sample pipes. With the end (right end as viewed in FIG. 1) of the pipe positioned at this reference point, the distance readout 54 is zeroed by operating reset button 62. Now the data for the position of the first bend is read from the document that contains such data and the pipe 44 is longitudinally moved until the distance display 54 reads the given longitudinal position of the first bend. Now the pipe is rotated until the seam is substantially at the uppermost portion of the pipe (most automobile exhaust pipe is made from welded pipe having a seam running the full length of the pipe). It is preferred to have the seam in a known position, and more particularly in the same position, for all pipes that are bent since the seam can cause errors in the bends. Such errors are repeatable if the same seam position is employed in the different pipes and, as previously mentioned, repeatable errors are eliminated in the method of the present invention.

Now with the pipe in its proper longitudinal position for the first bend and with the seam of the pipe uppermost (as a rotational reference position), operate button 42 is depressed for the first time to bring the die 10 into its setup position described above. Upon initial operation of the button 42, the die 10 moves downwardly until the switch 112 is actuated to stop the die in its setup position. With the pipe contacted by the die in setup position, the pipe may still be rotated by hand and the plane of the first bend can then be established by rotating the pipe against the light contact pressure of the dies. Generally the plane of the first bend may be arbitrarily chosen since it is only relative angulation of the several planes of bend that is of interest. Nevertheless, as previously mentioned, it is preferred to position the pipe so that the seam is facing upwardly to define the plane of the first bend. Now with the machine in setup position and having positioned the pipe rotationally for the plane of the first bend, the digital rotation display 52 is zeroed.

The final rotational positioning of the pipe is achieved with the pipe lightly grasped by the dies. This is done in order to eliminate rotation of the pipe about its axis that frequently occurs upon initial contact of the ram die with the pipe. Because of imperfections and irregularities in the pipe, it may be caused to rotate to some extent as the ram die 10 initially contacts the pipe but before the die pressure builds up to a degree sufficient to prevent such rotation and bend the pipe. If on the other hand, the ram die is already in a light but firm contact with the pipe, as in the set up mode of the present invention, the pipe may be rotationally positioned manually and further downward motion of the ram die to bend the pipe against the wing dies will not cause any additional rotation of the pipe about its axis. The light pressure of the die upon the pipe in setup position provides a restraint upon further (and unwanted) rotation of the pipe after it has been rotationally positioned with reference to display 52 and before commencing the subsequent bend.

Although a position detecting limit switch 112 is used to establish the set up mode with the ram die in light but firm contact with the pipe, it will be readily appreciated that a pressure switch operable in response to pressure in the hydraulic circuit of the machine may also be used to stop the pipe when a predetermined relatively light pressure of the ram die is experienced.

Having set the rotational position of the pipe and zeroed its rotational display, operate button 42 is again actuated and bending is completed. Ram die 10 resumes its downward motion, bending the pipe against the pivoting but restrained wing dies until the stop rod terminates downward motion of the ram die and causes it to return to its initial position.

Now the pipe is moved longitudinally until the distance display 54 presents a number equal to the number defining the longitudinal position of the second bend. Then operate button 42 is actuated to move the ram die to the set up position, lightly but firmly grasping the pipe. The pipe is then rotated until the rotation display 52 reads a number equal to the number defining the plane of rotation of the second bend. The operate button 42 is again actuated and the ram die once again resumes its downward motion to complete the second bend and return to its original position. Although all of the rotation of the pipe to position it in its desired plane of rotation according to the given bend data may be accomplished with the machine in its set up position, it is also contemplated that the pipe, after being longitudinally positioned but before the machine is placed in the set up mode, can be rotated to an approximate rotational position of the second plane of bend. Then the machine is moved to its set up position and the rotational position of the pipe is finalized, slightly rotating the pipe until the number in display 52 corresponds to the number of the given bend data that defines the plane of rotation of the second bend.

This procedure is then repeated for each of the subsequent bends of a given pipe. The operator is merely required to manually move the pipe longitudinally and rotationally while observing the numbers that appear on the several displays. As the pipe is moved longitudinally the number presented by the distance display varies. As the pipe is moved to the right, for example, as viewed in FIG. 1, the number presented in distance display 54 increases. Similarly, as the pipe is moved in the opposite direction, the number on the display decreases. Thus, the operator simply manually positions the pipe until the proper number appears. When the pipe is not moving, the number displayed no longer changes. Similarly, the operator simply rotates the pipe until the number presented on the rotation display 52 corresponds to the given data, this display number increasing or decreasing accroding to the direction of rotation of the pipe. As the pipe is rotated, the number changes. When the pipe is at rest rotationally, the number presented on display 52 is fixed.

Having completed all of the bends of a first pipe, the pipe is now measured and a set of measured bend data is provided. Preferably measurement of the pipe and the provision of the measured bend data are achieved by the use of a Vector I measuring instrument and data center of the type manufactured by the assignee of the present application and described in U.S. Pat. No. 3,944,798.

The measuring instrument such as the Vector I instrument, produces a set of measured data which is compared with the original given bend data. Each item of data of the original given bend data is then corrected by algebraically combining therewith the difference between such item of originally given bend data and the corresponding item of the measured data. Thus, for example, if a plane of bend of 90° (relative to a reference plane) is established for a particular bend in the original given bend data, and this plane of bend is measured as 85° (in a first sample pipe), a correction of 5° is required since the resulting plane of bend was 5° low. Thus, a new plane of bend angle of 95° is employed in the second set of given bend data. A similar correction, algebraically adding the difference between the original given figure and the measured figure so as to decrease the difference between the original given item and the measured item of the second pipe or of the next sample pipe, is made for each item of data.

Having corrected each item of data of the original set of given bend data, a second set of given bend data is obtained. This second set of given bend data is employed to bend a second sample pipe in the manner described above for the first sample pipe. The steps previously described are precisely repeated for the second sample pipe. Bending of the second sample pipe differs from the bending of the first only in that the second and correcting set of bend data is employed in the second. The second sample pipe is also measured with a Vector I measuring instrument. A second set of measured data is compared with the original set of given bend data and the set of second corrections is obtained and used to provie a third set of given bend data or a second corrected set of given bend data. Thus, in the previously mentioned example where 90° was defined as the plane of a given bend in the original set of given bend data and a 5° correction was added to make this item in the second set of given bend data 95°, measurement of the second sample pipe may, for example, show this item to be 89.5° which is now in error by 0.5°. Thus, a second corrected item of data would be provided having the value of 95.5° for this particular plane of bend, adding the second correction of 0.5° to the second corrected item of 95.0°. Similar corrections are made for all items of the data set. This second corrected set of given bend data is then employed to bend a third sample, precisely following the steps described above in connection with the bending of the first sample pipe.

In the practice of the present invention using the methods and apparatus described herein, it is found that the second or third sample pipe is usually satisfactory, having all of its bends within tolerances acceptable in the automobile industry for automobile exhaust pipes. This last used set of given bend data may be stored for subsequent use and bending of subsequent pipes of the type described by such data and will result in an acceptable pipe, generally on the second sample. The first sample made at a later time using this previously established and corrected set of given bend data will be slightly in error because of the different imperfections, irregularities and discrepancies inherent in the batch of pipe manufactured at a later time. Nevertheless, the corrected data set provides an advanced starting point for a later run.

When the first set of given bend data is corrected, once or twice as the case may be, and the final sample pipe has been determined to be within tolerances, another pipe is bent, and, as it is bent, is employed to construct a skeletal structure (not shown) in which a number of brackets are adjustably positioned so as to abut the bend that has previously been made. Thus, after the first bend has been made and the pipe has been positioned properly for the second bend, the bracket is positioned to contact a part of the pipe that has already been bent. Now the second bend is completed and the pipe is positioned for the third bend. In this position a second bracket is adjustably located to contact the part of the pipe that has already been bent and thereafter the pipe is positioned for subsequent bends and additional adjustable brackets are properly located. Having completed the skeletal structure and adjustment of the brackets, attachment 60 is no longer needed for this set up and a production run of pipes may be accomplished simply by positioning the pipe to contact one of the adjustable brackets for the appropriate bend to be made and large quantities of identical pipes may be then rapidly fabricated.

An unexpected and surprising advantage of the described method and apparatus is the ready availability of a means for checking the accuracy of the skeletal structure and its adjustable brackets at any time during the production run. Thus, any pipe being bent may have the fitting 60 attached thereto and the displays properly zeroed as previously described. Then the pipe may be bent and, as it is bent employing the skeletal structure and brackets for positioning, the pipe position just prior to making each bend may be read from the displays and this information checked against the set of given bend data being employed.

As previously mentioned, the described method eliminates repeatable error. Thus, if the forward end of the pipe (to the right as viewed in FIG. 1) is not positioned precisely at the center of the bend die when the distance display 54 is zeroed, for example, but if each sample pipe is positioned in the same location for zeroing of the distance display, any error in the longitudinal position of these bends due to such erroneous positioning is automatically eliminated (within acceptable tolerances) by the making of the corrections according to the measured bend data as previously described. Other repeatable errors may include a departure from horizontal of the cable 104. If cable 104 is not horizontally positioned, the apparatus will measure and display an inclined distance rather than a horizontal distance, assuming the axis of the pipe to be horizontal upon the horizontal pipe supporting bed. This will be in error but will be repeated in each sample pipe and thus this error is eliminated (within acceptable tolerances) by the described procedures.

Each of the stop rods, 32, 34, 36 comprises a threaded rod 120 and a nut 122 (FIG. 5) threaded thereon. For use of the described apparatus to facilitate adjustment of the length of these stop rods, there is provided a support fixture 124 having a base 126 and first and second relatively displaceable upstanding arms 128, 130. Preferably arm 128 is fixed to base 126 and arm 130 is mounted for slidable motion, having a T-shaped key 132 riding in a mating slot 134 formed in the base 126. Cable 104 attached drum 106 to operate encoder 110 passes through slot 134 for connection to the slidable arm key 132. Arm 130 is formed with a recess 138 to receive the nut 122. Arm 130 also has an aperture to receive the end of rod 120.

In use of the fixture 124 cable 104 is attached to the movable arm 130. The fixture is mounted in any suitable fixed location adjacent the housing 109 of drum 106 and encoder 110. Slidable arm 130 is moved to the left toward fixed arm 128 until it is in face-to-face contact with this arm at which time the distance display 54 is zeroed. Now arm 130 is moved to the right to space it from the fixed arm 128. A stop rod 120 is seated at one end against the face of arm 128. Arm 130, with the end of rod 120 extending through its aperture, is moved until the distance display 54 reads the desired length of the stop rod 120. The rod 120 is turned until nut 122 is engaged in the recess in movable arm 130. The reading on display 54 is checked and if correct, the length of the stop rod 120 above nut 112 has now been properly established. The stop rod is removed from the fixture 124 and replaced in the rotatable stop rod supporting plate 38. The other stop rods are similarly adjusted.

Although the invention has been described, for purposes of exposition, as employed with a vertically oriented press bending machine, it will be readily appreciated that principles of the invention may be applied for use in other types of press bending machines and in other types of bending machines such as compression bending machines and draw bending machines. Since the major components of the invention relate to fittings attachable to the pipe, it will be understood that application of the invention is not limited to any particular type of machine or machine configuration. Further, support 18 is sufficiently short or positioned and configured to avoid interference with fitting 60 during all bends.

It will be readily appreciated that instead of employing two separate displays 52 and 54, a single numerical display can be employed, time shared between distance and rotational readout, each readout indicating by appropriate symbol whether it is rotation or distance.

Although it is presently preferred to employ the described apparatus with a manual bending machine in which the pipe is positioned by the operator who manually grasps the pipe and moves it to the selected position, it will be readily appreciated that the apparatus may be employed with semi-automatic or even fully automatic apparatus. For example, the pipe may be longitudinally and rotationally positioned by other than manual means and the described apparatus may be employed to generate signals which will be compared with pre-set signals that indicate a preselected longitudinal and rotational position of the pipe. The difference between the rotation and longitudinal position signals generated by the described apparatus and the command signals of rotation and longitudinal position will operate mechanical pipe grasping devices such as a brake or the like that will stop the motion of the pipe at the commanded position of rotational and longitudinal motion. For example, the pipe may move through a collet having clamping segments which are operated by suitable electronics when electrical signals generated by the described rotation and longitudinal position sensing devices attain a certain magnitude.

Figure 6:
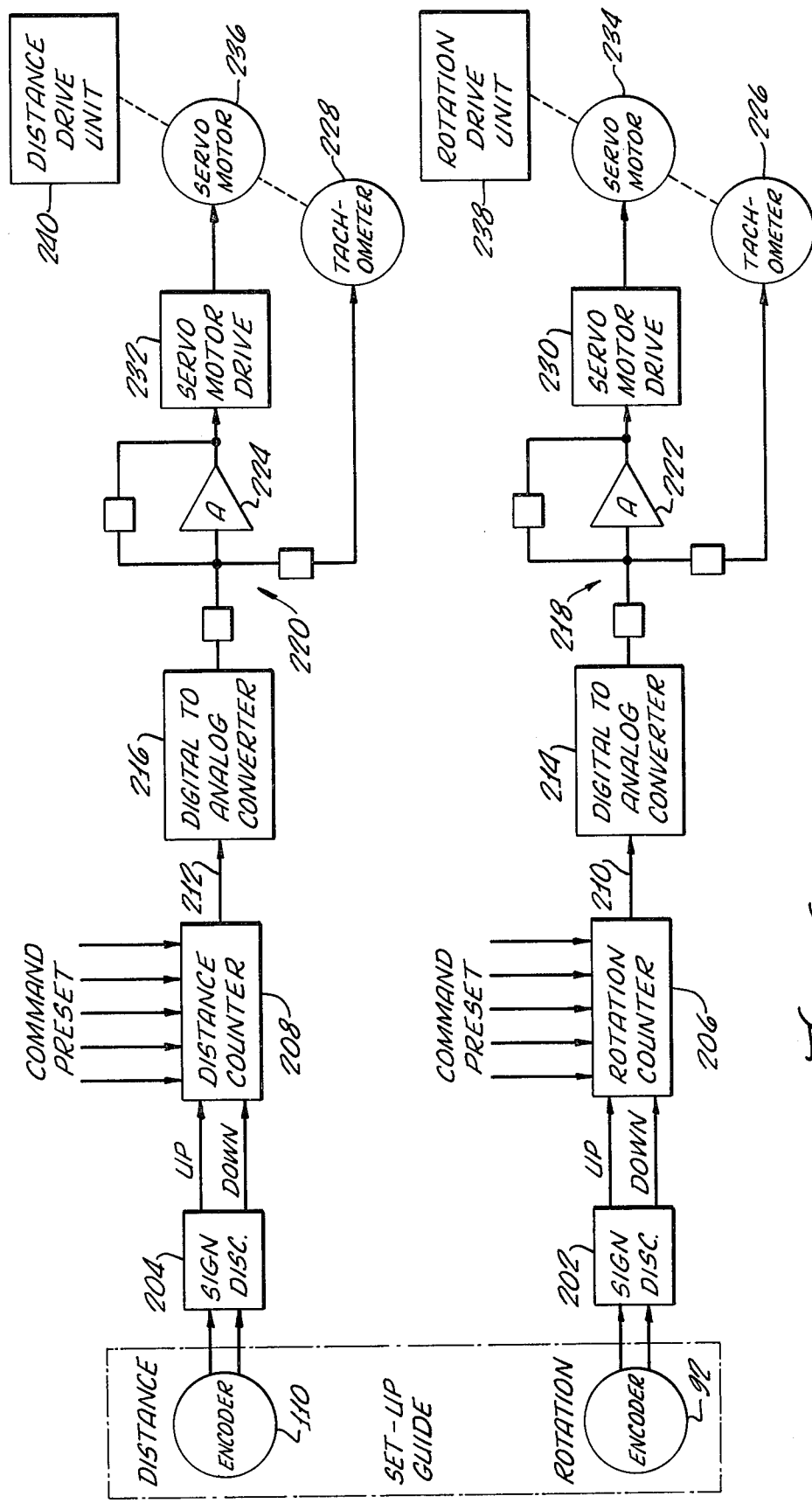
FIG. 6 is a block diagram of a typical application of the present invention for automatically positioning pipe for bending.

An example of an automatic system employing principles and apparatus of the present invention, is illustrated in FIG. 6 wherein rotation encoder 92 and distance encoder 110, constructed, arranged and connected as previously described, are electrically connected to feed electrical signals to sign discriminating circuits 202, 204, each of which feeds a pair of signals indicating increments of sensed rotation or translational motion in either position or negative sense to respective distance counters 206, 208. Pre-set command signals representing preselected rotational or longitudinal positions respectively, are fed to the counters 206, 208 by suitable means such as a punched card, tape or manually operated keyboard (not shown) to provide error signals on output lines 210, 212, representing the difference between sensed and commanded pipe positions. The error signals are fed to respective digital to analog converters 214, 216 and thence, via summing networks 218, 220, to servo amplifiers 222, 224 having second inputs from feedback tachometers 226, 228. The amplifiers 222, 224 respectively operate servo motor drive circuits 230, 232 which drive servo motors 234, 236, the output shaft speeds of which are sensed by tachometers 226, 228, respectively. Servo motor 234 drives a pipe rotation unit 238 and servo motor 236 drives a distance or longitudinal pipe driving unit 240.

The rotation and distance drive units 228 and 240, together with their associated driving motors, may be of the type employed in any one of a number of different types of automatic tube bending machines. For example, as shown in U.S. Pat. No. 3,974,676, an automatic bending machine includes a carriage mounted upon a track for longitudinal motion and carrying a rotatable chuck which grasps the pipe. Longitudinal motion of the carriage along the track moves the pipe longitudinally and rotational motion of the chuck relative to the carriage and relative to the tracks moves the pipe rotationally. Such a device is readily provided with independent drive motors such as servo motors 234 and 236, illustrated in FIG. 6, and such servo motors may be controlled by rotation and longitudinal motion sensing devices of the type described herein.

There have been described methods and apparatus for aiding the set up of a bending machine, significantly minimizing adjustments and operations to be performed by the machine operator and readily adaptable to any one of a number of different makes and types of bending machines, whether of the press bending, compression bending or draw bending type, and having manually or automatically powered feed for the pipe.

The foregoing detailed description is to be clearly understood as given by way of illustration and example only, the spirit and scope of this invention being limited solely by the appended claims.

What is claimed is:

1. For use in a machine for bending pipe that is manually rotated and longitudinally shifted for bending, apparatus for indicating longitudinal and rotational position of the pipe comprising, a fitting adapted to be connected to a pipe to be bent,
first sensing means mounted upon said fitting and independent of machine structure for generating a first electrical signal indicative of rotation of the pipe,
second sensing means connected with said fitting for generating a second electrical signal indicative of longitudinal position of the pipe, and
means responsive to said first and second signals for displaying values indicative of pipe rotation and pipe longitudinal position.

2. The apparatus of claim 1 wherein said first sensing means comprises an angular reference device pivotally mounted to said fitting and first detector means for generating said first electrical signal in accordance with angular displacement of said fitting with respect to said angular reference device.

3. The apparatus of claim 2 wherein said angular reference device comprises a pendulous mass pivoted to said fitting for motion about the axis of said pipe.

4. The apparatus of claim 1 wherein said second sensing means comprises an elongated longitudinal position indicating member connected with said fitting and second detector means for generating said second electrical signal in accordance with the longitudinal position of said position indicating member.

5. For use in a machine for bending pipe, apparatus for indicating longitudinal and rotational position of the pipe comprising,
a fitting adapted to be connected to a pipe to be bent, first sensing means connected with said fitting for generating a first electrical signal indicative of rotation of the pipe,
second sensing means connected with said fitting for generating a second electrical signal indicative of longitudinal position of the pipe,
means responsive to said first and second signals for displaying values of pipe rotation and pipe longitudinal position,
said second sensing means comprising an elongated longitudinal position indicating member connected with said fitting,
second detector means for generating said second electrical signal in accordance with the longitudinal position of said position indicating member,
said position indicating member comprising a flexible cable having one end connected to said fitting,
a drum mounted for rotation about an axis fixed with respect to said machine,
means connecting said cable to said drum for rotation of said drum in accordance with longitudinal motion of said fitting, and said second detector means comprising means for generating said second electrical signal in accordance with rotation of said drum.

6. The apparatus of claim 1 wherein said fitting comprises a housing adapted to be detachably secured to an end of pipe to be bent, and wherein said first sensing means comprises a vertical reference device mounted to said housing for pivotal motion about an axis coincident with the axis of said pipe, and a shaft position encoder mounted to said housing and connected with said vertical reference device for generating said first electrical signal in accordance with the angular displacement between said reference device and said housing.

7. For use in a machine for bending pipe, apparatus for indicating longitudinal and rotational position of the pipe comprising,
a fitting adapted to be connected to a pipe to be bent,
first sensing means connected with said fitting for generating a first electrical signal indicative of rotation of the pipe,
second sensing means connected with said fitting for generating a second electrical signal indicative of longitudinal position of the pipe,
means responsive to said first and second signals for displaying values of pipe rotation and pipe longitudinal position,
said second sensing means comprising a drum mounted for rotation about an axis fixed with respect to said machine and having a pivot shaft, a shaft position encoder connected with said pivot shaft for generating said second electrical signal as a function of angular displacement of said drum, and a cable wound about said drum and having an end connected to said fitting.

8. The apparatus of claim 7 wherein said fitting comprises a housing adapted to be detachably secured to an end of a pipe to be bent, and wherein said first sensing means comprises a pendulous mass mounted within said housing for limited pivotal motion about an axis coincident with the axis of said pipe, and a shaft position encoder mounted to said housing and connected with said pendulous mass for generating said first electrical signal in accordance with angular displacement between said pendulous mass and said housing.

9. The apparatus of claim 1 wherein said fitting includes chuck means for gripping an end of a pipe to be bent to thereby secure the fitting to the pipe.

10. The apparatus of claim 2 including means responsive to said first electrical signal and to a rotation command signal representing a preselected angular position of the pipe for rotating said pipe.

11. The apparatus of claim 5 including means responsive to said second electrical signal and to a command signal representing a longitudinal position of said pipe for moving said pipe longitudinally.

12. The apparatus of claim 8 including means responsive to said first and second electrical signals for moving said pipe to a selected angular displacement and longitudinal position.

13. The method of forming a pipe with a plurality of bends each having a longitudinal position and plane of bend defined by given bend data, said method comprising the steps of
generating first and second signals respectively indicative of angular displacement of said pipe about its axis and translational displacement of said pipe along its axis,
presenting said first and second signals for quantitative display,
manually displacing said pipe both longitudinally and rotationally until said displays present the given data for a first one of said bends, and manually stopping longitudinal and rotational motion of said pipe in response to observation of said displays, bending said pipe,
again manually displacing said pipe longitudinally and rotationally until said displays present the given data for a second bend, and again manually stopping longitudinal and rotational motion of said pipe in response to observation of said displays, and again bending said pipe in said second position of longitudinal and rotational displacement.

14. The method of claim 13, including initially positioning said pipe in longitudinal and rotational reference positions and zeroing said quantitative displays when said pipe is in said reference positions.

15. The method of claim 13, including the steps of measuring the positions and planes of bends attained in accordance with the previously mentioned steps to obtain measured bend data, correcting the given bend data in accordance with the difference between such given bend data and the measured data, and repeating the previously mentioned positioning and bending steps upon another pipe.

16. For use in a machine for bending pipe, apparatus for indicating longitudinal and rotational position of the pipe comprising, a fitting adapted to be connected to a pipe to be bent,
first sensing means for generating a first electrical signal indicative of rotation of the pipe,
a cable extending between and connected to each of first and second points respectively fixed to said fitting and to structure fixed with respect to said machine,
a drum rotatably mounted at one of said points and having said cable wound thereon,
means for generating a second electrical signal in accordance with rotation of said drum,
means responsive to said first and second signals for displaying values indicative of pipe rotation and pipe longitudinal position.

17. The apparatus of claim 16 wherein said first sensing means comprises a pendulous mass pivoted to said fitting for motion about the axis of said pipe, and means for generating said first electrical signal in accordance with angular position of said mass relative to said fitting.

* * * * *

UNITED STATES PATENT AND TRADEMARK OFFICE
CERTIFICATE OF CORRECTION

PATENT NO. : 4,080,814
DATED : March 28, 1978
INVENTOR(S) : Homer L. Eaton

It is certified that error appears in the above-identified patent and that said Letters Patent are hereby corrected as shown below:

Col. 3, line 16: Change "trail" to ---trial---;

Col. 6, line 49: Change "117" to ---112---;

Col. 9, line 48: Change "correcting" to ---corrected---;

Col. 12, line 17: Change "position" to ---positive---;

Col. 12, line 36: Change "228" to ---238---.

Signed and Sealed this

Twelfth Day of September 1978

[SEAL]

Attest:

RUTH C. MASON
Attesting Officer

DONALD W. BANNER
Commissioner of Patents and Trademarks